(12) United States Patent
Alford

(10) Patent No.: US 8,071,926 B2
(45) Date of Patent: Dec. 6, 2011

(54) STABILITY MULTIPLEXED AUTOPILOT

(75) Inventor: Robert L Alford, Excelsior, MN (US)

(73) Assignee: Simmonds Precision Products, Inc., Vergennes, VT (US)

( * ) Notice: Subject to any disclaimer, the term of this patent is extended or adjusted under 35 U.S.C. 154(b) by 196 days.

(21) Appl. No.: 12/353,004

(22) Filed: Jan. 13, 2009

(65) Prior Publication Data

US 2010/0176238 A1    Jul. 15, 2010

(51) Int. Cl.
- *F41G 7/00* (2006.01)
- *F42B 15/01* (2006.01)
- *F42B 15/00* (2006.01)

(52) U.S. Cl. ........ 244/3.15; 89/1.11; 244/3.1; 244/3.21; 244/3.23; 244/3.24

(58) Field of Classification Search ............ 244/3.1–3.3; 102/382, 384, 473, 501; 701/1, 3–18, 200, 701/207, 213–216; 89/1.11
See application file for complete search history.

(56) References Cited

U.S. PATENT DOCUMENTS

| | | | | |
|---|---|---|---|---|
| 3,170,656 A | * | 2/1965 | Cole | 244/3.15 |
| 3,760,755 A | * | 9/1973 | Licata | 244/3.15 |
| 4,044,970 A | * | 8/1977 | Maudal | 244/3.22 |
| 4,418,610 A | * | 12/1983 | Holtrop | 244/3.21 |
| 4,470,562 A | * | 9/1984 | Hall et al. | 244/3.2 |
| 4,565,340 A | * | 1/1986 | Bains | 244/3.28 |
| 6,360,986 B1 | * | 3/2002 | Larcher et al. | 244/3.15 |
| 6,827,310 B1 | * | 12/2004 | Whitham | 244/3.24 |
| 6,986,481 B2 | * | 1/2006 | Fanucci et al. | 244/3.26 |
| 7,533,849 B2 | * | 5/2009 | Zemany et al. | 244/3.16 |
| 7,793,606 B2 | * | 9/2010 | Olivier et al. | 244/3.28 |
| 7,800,031 B2 | * | 9/2010 | Rastegar et al. | 244/3.22 |
| 2007/0205320 A1 | * | 9/2007 | Zemany et al. | 244/3.16 |
| 2007/0241227 A1 | * | 10/2007 | Zemany et al. | 244/3.1 |
| 2008/0029641 A1 | * | 2/2008 | Carlson et al. | 244/3.24 |

OTHER PUBLICATIONS

Tony R. Kuphaldt et al., "Stepper Motors"; posted on the Internet at electojects.com; copyright in the year 2007.*
"Guidance, Navigation and Control Without Gyros: A Gun-Launched Munition Concept", Ernest J. Ohlmeyer, et al., American Institute of Aeronautics and Astronautics, AIAA Guidance, Navigation, and Control Conference and Exhibit, Aug. 5-8, 2002, Monterey California, pp. 1-14.

* cited by examiner

*Primary Examiner* — Bernarr Gregory
(74) *Attorney, Agent, or Firm* — Smith Moore Leatherwood LLP

(57) ABSTRACT

Rolling airframe projectile guidance and stability systems are disclosed. Flight control surfaces, such as canards and/or tail fins are attached to a projectile airframe that is designed to roll during flight. Stepper motors are attached to the flight control surfaces and move the flight control surfaces in discrete increments. A control system generates signals that control the flight control surfaces. The control system may include a neural network that is trained to generate control signals in response to received inputs.

16 Claims, 5 Drawing Sheets

STABILITY MULTIPLEXED AUTOPILOT

FIELD

The invention relates to flight control systems. More particularly, the invention provides methods and systems for implementing a stable and controllable rolling airframe projectile.

BACKGROUND

Some existing rolling airframe projectiles, such as mortars, artillery shells, missiles and bombs use canards to guide the projectiles. Canards can be adjusted to create a pitch moment that influences the path of the projectile. Larger canards are often desirable because they allow for more control than relatively smaller canards. However, rolling airframe projectiles can become inherently unstable when large canards are utilized.

Conventional control systems have been used to stabilize inherently unstable rolling airframes. Conventional control systems utilize servo motors and computer devices that calculate desired positions of canards. For example, a conventional control system may process a variety of inputs and calculate exact desired positions for a pair of canards. These types of control systems may be accurate. However, the use of servo motors and controllers that are required to process large amounts of data make such systems expensive.

Therefore, there is a need in the art for improved rolling airframe projectile stabilization and guidance systems and methods.

SUMMARY

Various needs in the art are satisfied by the disclosed rolling airframe projectile systems and methods. In various embodiments, flight control surfaces, such as canards, are attached to a projectile that is configured to roll during flight. The canards may be large enough to cause the projectile to become inherently unstable during flight. The canards may be moved in discrete steps with stepper motors. A neural network may be configured to receive information such as projectile state data and guidance commands and generate stepper motor commands to reposition the canards.

In certain embodiments of the invention, the present invention can be partially or wholly implemented with a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
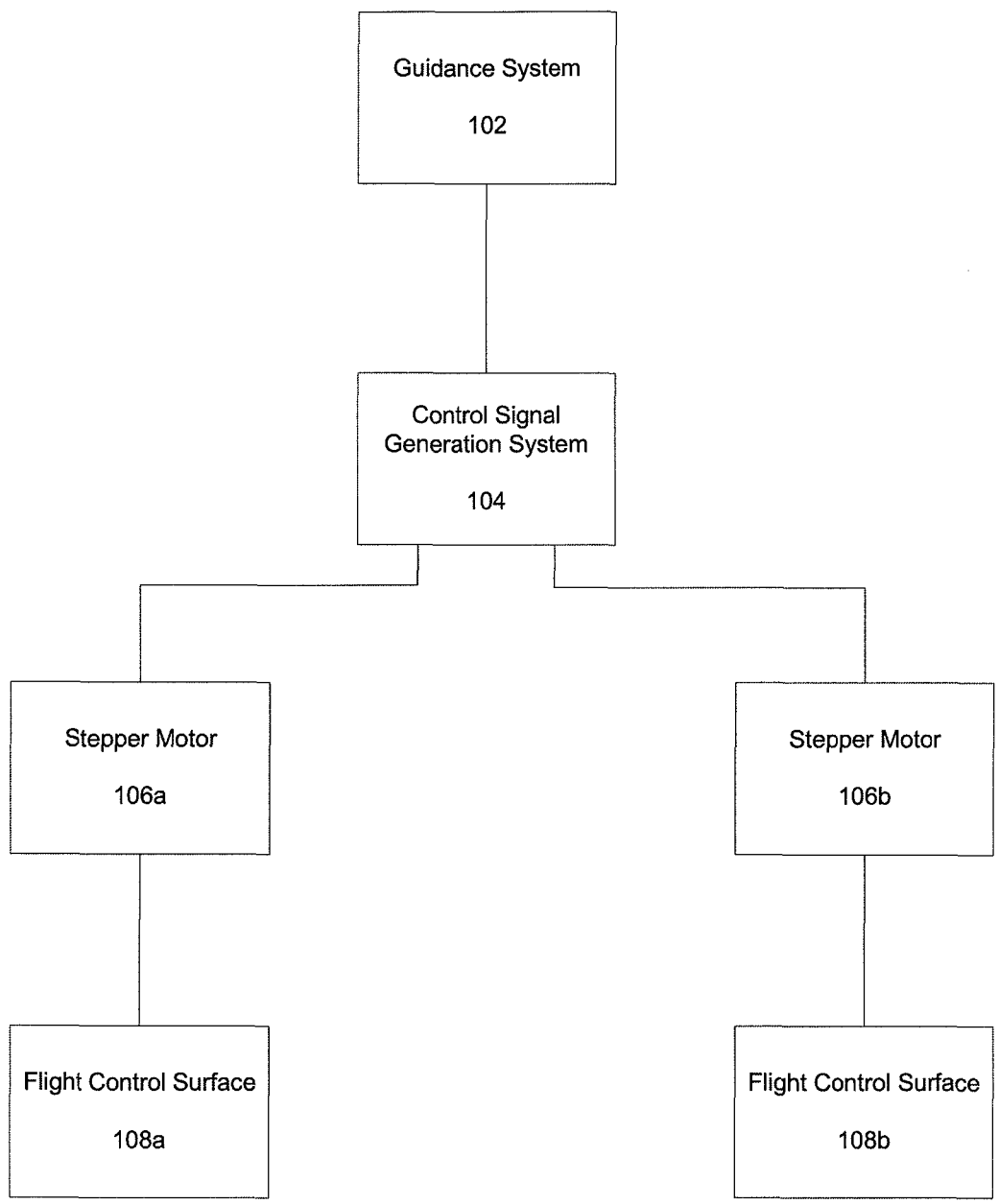
FIG. 1 illustrates a schematic diagram of components of a rolling airframe projectile guidance and stability control system, in accordance with an embodiment of the invention.

FIG. 1 illustrates a schematic diagram of components of a rolling airframe projectile, in accordance with an embodiment of the invention. A guidance system 102 may be used to generate guidance commands that will be applied to a control signal generation system 104. Guidance system 102 may be implemented with a global positioning system, an inertial measurement unit (IMU), a combination of a global positioning system and an inertial measurement unit and/or other systems that may be used to determine a location and desired path for the projectile.

Control signal generation system 104 may be configured to receive guidance commands and generate signals that are used to control stepper motors 106a and 106b. Control signal generation system 104 may be implemented with a neural network, a memory module that includes a table of control commands associated with input values or any other system configured to receive guidance commands and/or other commands and generate signals to control stepper motors.

Stepper motors 106a and 106b may be implemented with conventional motors that are configured to move in discrete increments or steps. Stepper motors 106a and 106b are connected to flight control surfaces 108a and 108b. Flight control surfaces 180a and 108b may be implemented with canards attached to the front of a rolling airframe projectile and/or tailfins attached to a tail of a rolling airframe projectile.

The system shown in FIG. 1 provides a relatively inexpensive solution for guiding and stabilizing a rolling airframe projectile, particularly when compared to a system that includes expensive servo motors and control computers. The use of stepper motors that are designed to move in discrete increments simplifies the design and processing capability required by control signal generation system 104.

Figure 2:
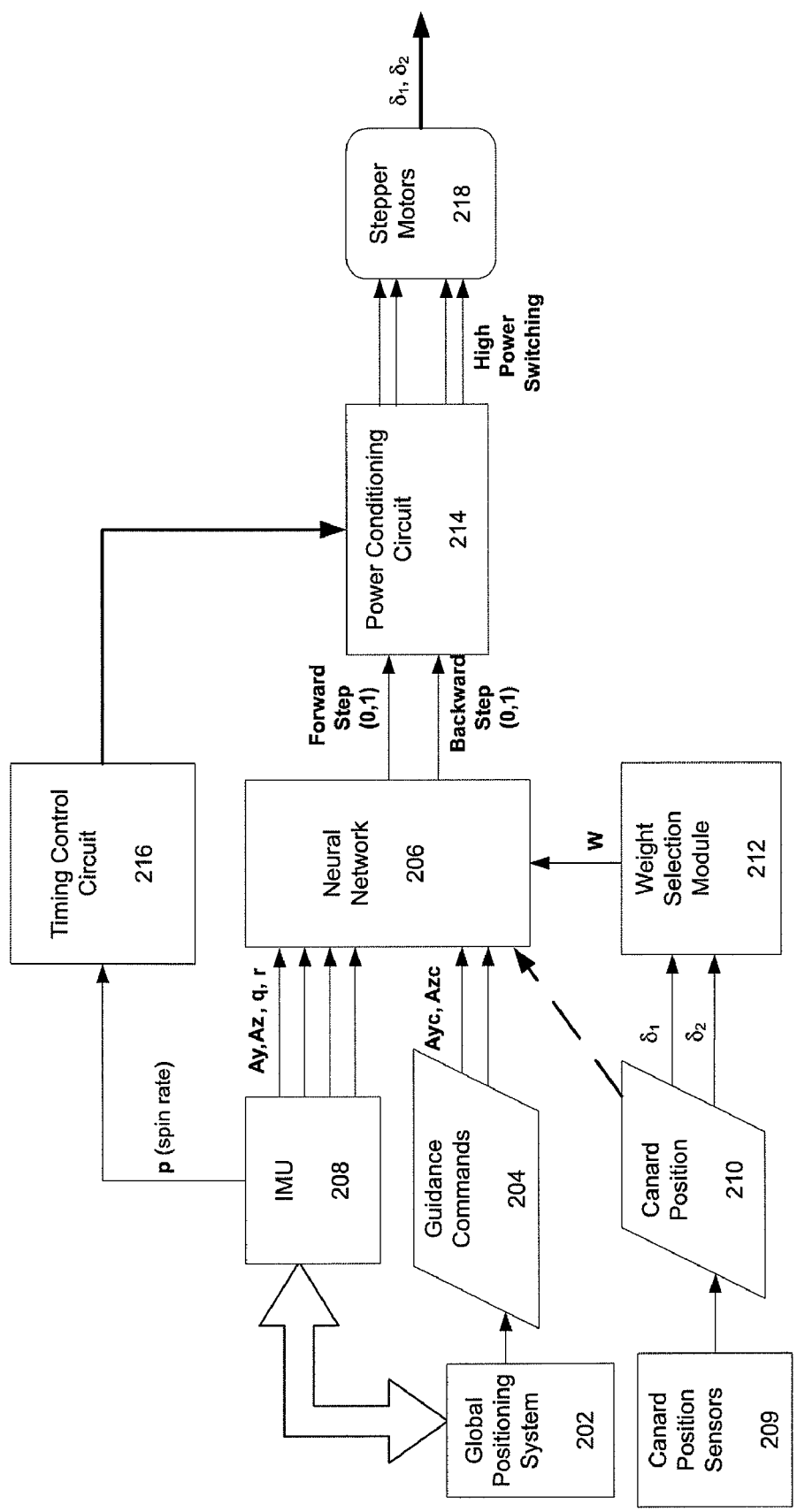
FIG. 2 illustrates a detailed schematic diagram of a rolling airframe projectile guidance and stability control system, in accordance with another embodiment of the invention.

FIG. 2 illustrates a more detailed schematic diagram of a rolling airframe projectile guidance and stability control system, in accordance with an embodiment of the invention. A global positioning system 202 may be used to provide guidance commands 204 to a neural network 206. Neural network 206 may also receive guidance information from an inertial measurement unit (IMU) 208. In one embodiment, global positioning system 202 is deeply coupled to inertial measurement unit (IMU) 208. Neural network 206 may also receive information representing a state of the rolling airframe projectile. The state information may include rates and accelerations of the airframe as well as canard positions. Sensors 209 may generate canard position data 210 and the position data may be provided to a weight selection module 212. Weight selection module 212 may be configured to process the canard position data and select appropriate weights that will be utilized by neural network 206. In another embodiment, canard position data 210 may be provided directly to neural network 206. This embodiment eliminates the need for a weight selection module at the expense of requiring a higher dimension neural network.

Neural network 206 may be configured to receive data representing the state of the rolling airframe projectile as well as guidance commands and generate step signals that are provided to a power conditioning circuit 214. Neural network 206 may be implemented with a conventional neural network that has been trained using a neural network training process. In one embodiment, the training process uses an offline Monte Carlo simulation. The simulation may account for aerodynamics of the projectile and may generate thousands of simulated solutions. Of course, other models and simulation processes may also be utilized. The simulated solutions may be used to assign neural network weights using well known processes. The weights may be stored in weight selection module 212 and/or neural network 206.

Power conditioning circuit 214 may be configured to receive step input signals as well as timing information from a timing control circuit 216 and generate switching signals to apply to stepper motors 218. The switching signals may have power levels that are greater than the power levels of the step input signals. The switching signals may move the stepper motors backwards or forwards in discrete increments, such as 2 degrees, or keep the motors stationary. Stepper motors 218 are attached to flight control surfaces, as described above.

Figure 3:
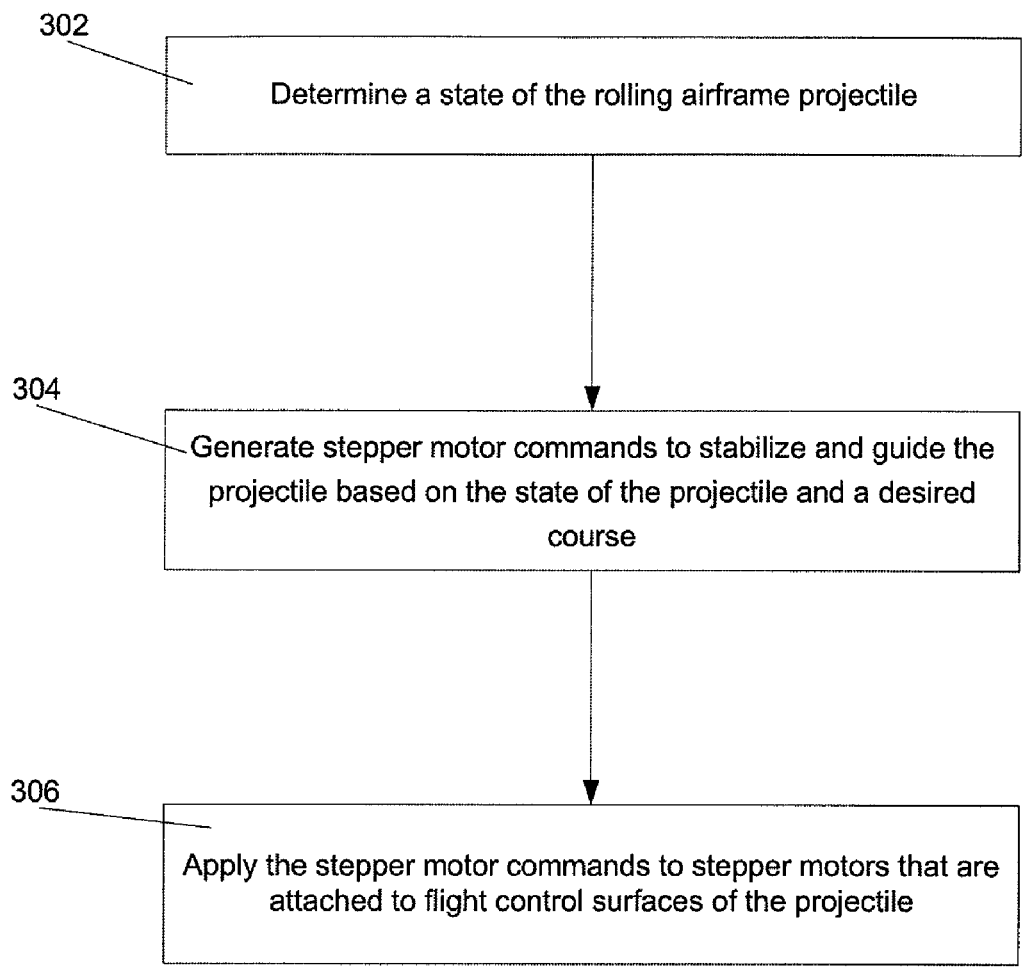
FIG. 3 illustrates a method of controlling and guiding a rolling airframe projectile, in accordance with an embodiment of the invention.

FIG. 3 illustrates a method of controlling and guiding a rolling airframe projectile, in accordance with an embodiment of the invention. First, in step 302 a state of the rolling airframe projectile is determined. Step 302 may include determining the position of any canards and tailfins as well as determining a location of the rolling airframe projectile. In step 304 stepper motor commands are generated to stabilize and guide the projectile based on the state of the projectile and a desired course. Step 304 may be performed with a neural network or other type of control device. Next, the stepper motor commands are applied to stepper motors that are attached to flight control surfaces of the projectile in step 306. The resulting movement of the flight control surfaces results in the stabilization and guidance of the projectile.

In various embodiments flight control surfaces may be driven in a multiplexed manner to stabilize a rolling airframe along more than one axis. For example, the flight control surfaces may be driven to control the rolling airframe along one axis and then after the airframe rotates, the flight control surfaces may be driven to control the airframe along another axis. This configuration allows for stabilization along multiple axes with a single axis of control input. A neural network, such as neural network 206, may be trained to provide control signals to control surfaces as the airframe rotates to implement control of multiple axes with a single axis of control input. Whiled the embodiment shown in FIG. 1 uses two flight control surfaces, one skilled in the art will appreciate that in other embodiments three or more flight control surfaces may be utilized.

Figure 4:
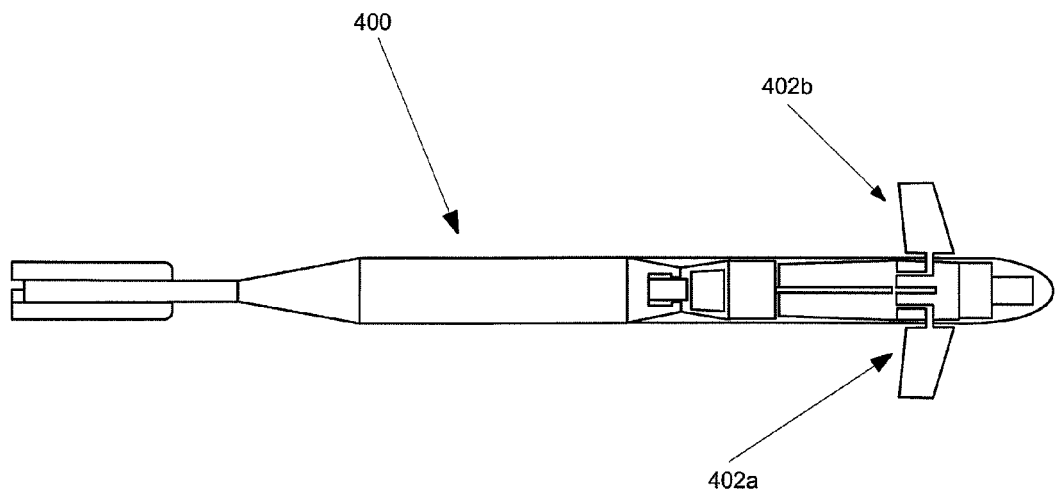
FIG. 4 illustrates an exemplary mortar round that includes canards, in accordance with an embodiment of the invention.

FIG. 4 illustrates an exemplary mortar round 400, in accordance with an embodiment of the invention. Mortar round 400 includes canards 402a and 400b. Canards 402a and 402b are controlled by two stepper motors (not shown).

Figure 5:
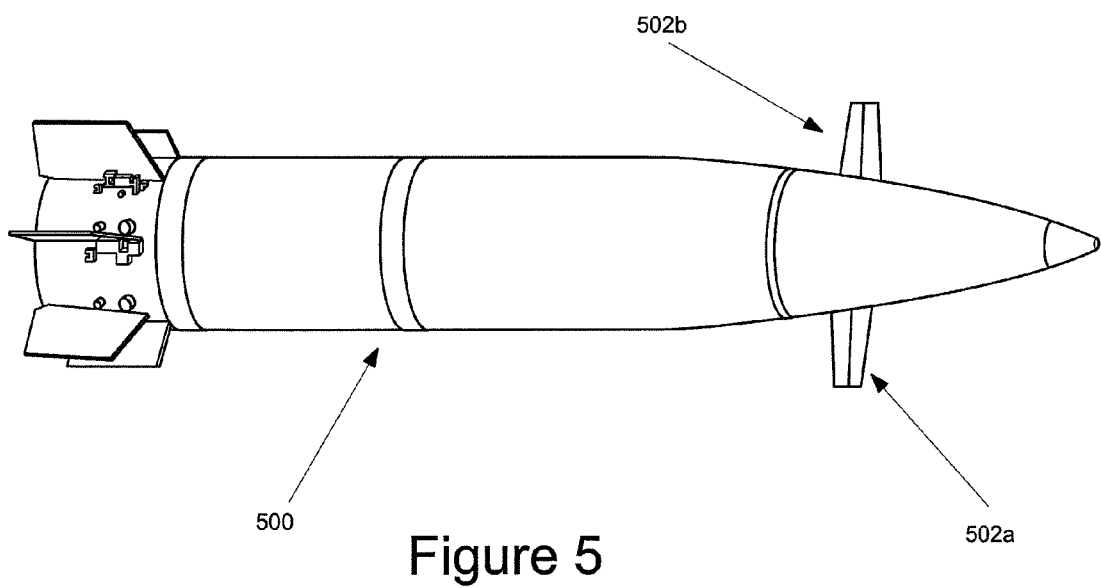
FIG. 5 illustrates an artillery shell that includes canards, in accordance with an embodiment of the invention.

FIG. 5 illustrates an artillery shell 500 in accordance with an embodiment of the invention. Artillery shell 500 includes canards 502a and 502b. Canards 502a and 502b are controlled by two stepper motors (not shown).

Figure 6:
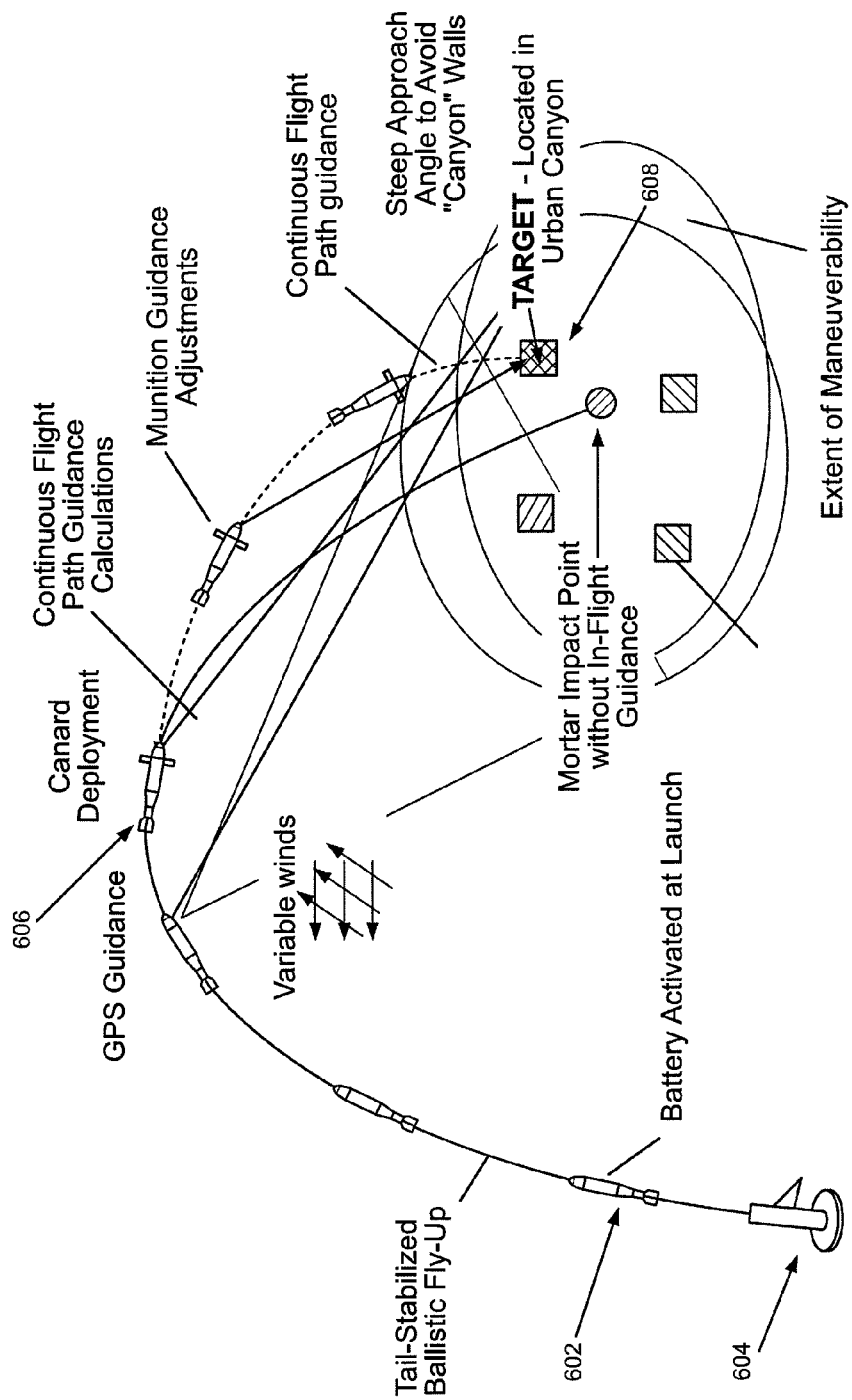
FIG. 6 illustrates a flight path of a mortar shell configured in accordance with an embodiment of the invention.

FIG. 6 illustrates a flight path of a mortar shell 602 configured in accordance with an embodiment of the invention. Mortar shell 602 is launched from a base 604. Canards are deployed when mortar shell 602 reaches a location 606. The canards are controlled by stepper motors as described above. During the remainder of the flight the canards are used to guide and stabilize the mortar shell until the shell reaches a target 608.

In another embodiment, aspects of the invention may be used to create a kit to retrofit existing projectiles. For example, a guidance system, a control signal generation system, canards, and flight control surfaces may be added to existing projectiles.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, aspects of the disclosed system may use servo motors.

I claim:

1. A projectile comprising:
   an airframe configured to roll during flight;
   a plurality of flight control surfaces attached to the airframe and configured to stabilize and guide the projectile during flight;
   a plurality of stepper motors attached to the plurality of flight control surfaces, each stepper motor of the plurality of stepper motors independently controlling a corresponding one of the plurality of flight control surfaces; and
   a control system configured to generate signals to control the plurality of stepper motors in discrete steps to stabilize and guide the projectile.

2. The projectile in claim 1, further including a guidance system configured to provide guidance commands to the control system.

3. The projectile in claim 1, further including a guidance system that provides one or more outputs to the control system, wherein the guidance system includes at least one of a global positioning system and an inertial measurement unit.

4. The projectile of claim 3, wherein the control system includes a neural network that uses the one or more outputs of the guidance system to generate the signals to control the plurality of stepper motors.

5. The projectile in claim 1, wherein the control system generates the signals to control the plurality of stepper motors using a neural network.

6. The projectile in claim 5, wherein the control system further includes a weight selection circuit configured to determine weights for the neural network based on position data of the plurality of flight control surfaces and provide the weights to the neural network.

7. The projectile in claim 1, wherein the plurality of flight control surfaces comprise canards.

8. The projectile in claim 7, wherein the control system comprises a neural network.

9. The projectile in claim 1, wherein the control system comprises a memory module that includes a table of control commands associated with sensor input values.

10. The projectile of claim 1, wherein the control system comprises a memory module that includes a table of control commands associated with inputs to the control system and the control system is further configured to select one or more of the control commands based on the inputs to the control system and provide the selected one or more control commands as the signals to control the plurality of stepper motors.

11. The projectile of claim 1, wherein the control system includes a neural network that uses input data to generate the signals to control the plurality of stepper motors, the input data including one or more of the following: data from a global positioning system, an inertial measurement unit, projectile state information including a rate of the projectile, projectile state information including an acceleration of the projectile, and position data of the flight control surfaces from one or more sensors of the projectile.

12. A method comprising:
(a) determining a state of a rolling airframe projectile;
(b) generating stepper motor commands to stabilize and guide the projectile based on the state of the rolling airframe projectile and a desired course; and
(c) applying the stepper motor commands to a plurality of stepper motors that are attached to a plurality of flight control surfaces of the rolling airframe projectile, each stepper motor of the plurality of stepper motors independently controlling a corresponding one of the plurality of flight control surfaces.

13. The method of claim 12, wherein (a) includes determining a location of the rolling airframe projectile with a global positioning system, and (b) includes using the location of the rolling airframe projectile to generate the stepper motor commands.

14. The method of claim 13, wherein (a) includes determining positions of the plurality of flight control surfaces, and (b) includes using the positions of the plurality of flight control surfaces to generate the stepper motor commands.

15. The method of claim 12, wherein (b) includes generating the stepper motor commands with a neural network using the state of the rolling airframe projectile.

16. The method of claim 12, wherein the plurality of flight control surfaces comprise at least one of canards and tail fins.

* * * * *